(12) United States Patent  (10) Patent No.:  US 8,646,934 B2
Fredricks  (45) Date of Patent:  Feb. 11, 2014

(54) AQUARIUM LIGHT STRIP

(75) Inventor: Dennis Fredricks, Escondido, CA (US)

(73) Assignee: Cogent Designs, Inc., Escondido, CA (US)

( * ) Notice: Subject to any disclaimer, the term of this patent is extended or adjusted under 35 U.S.C. 154(b) by 352 days.

(21) Appl. No.: 12/876,931

(22) Filed: Sep. 7, 2010

(65) Prior Publication Data

US 2011/0255267 A1    Oct. 20, 2011

Related U.S. Application Data

(63) Continuation-in-part of application No. 12/760,389, filed on Apr. 14, 2010, now Pat. No. 8,230,815.

(51) Int. Cl.
*F21S 4/00*    (2006.01)

(52) U.S. Cl.
USPC .............. 362/101; 362/249.02; 362/249.06; 362/249.11; 362/650

(58) Field of Classification Search
USPC ............... 362/101, 249.02, 249.06, 249.11, 362/311.02, 318, 650
See application file for complete search history.

(56) References Cited

U.S. PATENT DOCUMENTS

| | | | |
|---|---|---|---|
| 2,988,312 A | | 6/1961 | Dumas |
| 3,828,176 A | | 8/1974 | Goldman et al. |
| 3,834,351 A | | 9/1974 | Schmidt |
| 3,955,076 A | * | 5/1976 | Shaw .......................... 362/183 |
| 4,994,943 A | | 2/1991 | Aspenwall |
| 5,089,940 A | | 2/1992 | Lanzarone et al. |
| 5,165,778 A | | 11/1992 | Mathias et al. |
| 5,211,469 A | | 5/1993 | Mathias et al. |
| 5,848,837 A | | 12/1998 | Gustafson |
| 5,927,845 A | | 7/1999 | Gustafson et al. |
| 6,065,849 A | | 5/2000 | Chen |
| 6,166,496 A | | 12/2000 | Lys et al. |
| 6,184,628 B1 | | 2/2001 | Ruthenberg |
| 6,577,080 B2 | | 6/2003 | Lys et al. |
| 6,673,292 B1 | | 1/2004 | Gustafson et al. |
| 6,781,329 B2 | | 8/2004 | Mueller et al. |
| 6,921,182 B2 | | 7/2005 | Anderson, Jr. et al. |
| 6,967,448 B2 | | 11/2005 | Morgan et al. |
| 7,168,862 B2 | | 1/2007 | Qi et al. |
| 7,187,141 B2 | | 3/2007 | Mueller et al. |
| 7,220,018 B2 | | 5/2007 | Crabb et al. |
| 7,221,104 B2 | | 5/2007 | Lys et al. |
| 7,258,459 B2 | | 8/2007 | Wang |
| 7,293,914 B2 | * | 11/2007 | Wang ............................ 374/141 |
| 7,427,840 B2 | | 9/2008 | Morgan et al. |

(Continued)

FOREIGN PATENT DOCUMENTS

DE    4218880    7/1993
GB    2266043    10/1993

*Primary Examiner* — Sharon Payne
(74) *Attorney, Agent, or Firm* — Sheppard Mullin Richter & Hampton LLP (57) ABSTRACT

Various embodiments of the present invention provide a lighting system and apparatus that may be utilized with aquariums. The features and functionality of the lighting system and apparatus provide easy access to the opening of an aquarium for various purposes, such as cleaning and maintenance. In addition, the features and functionality of some embodiments provide a lighting system that does not require ballasts, light sockets, or a multitude of wiring, and includes a modular design. Further, for some embodiments, features of the present invention allow the lighting apparatus to illuminate the aquarium, while simultaneously limiting the evaporation of water from the aquarium.

16 Claims, 10 Drawing Sheets

(56) References Cited

U.S. PATENT DOCUMENTS

| | | |
|---|---|---|
| 7,436,134 B2 * | 10/2008 | Levine .......................... 315/360 |
| 7,445,352 B2 * | 11/2008 | Lin .............................. 362/101 |
| 7,453,217 B2 | 11/2008 | Lys et al. |
| 7,473,008 B2 | 1/2009 | Crabb et al. |
| 7,482,764 B2 | 1/2009 | Morgan et al. |
| 7,834,548 B2 * | 11/2010 | Jousse et al. .................. 313/506 |
| 8,167,468 B1 * | 5/2012 | Olsson et al. ................. 362/477 |

* cited by examiner

AQUARIUM LIGHT STRIP

CROSS-REFERENCE TO RELATED APPLICATIONS

This application is a continuation-in-part of and claims the benefit of U.S. application Ser. No. 12/760,389 filed Apr. 14, 2010, which is hereby incorporated herein by reference in its entirety.

FIELD OF THE INVENTION

The present invention relates to lighting apparatus and, more particularly, some embodiments are directed toward lighting apparatus used in conjunction with aquariums.

DESCRIPTION OF THE RELATED ART

Conventional aquarium light fixtures are generally composed of a shaded lamp affixed above the opening of an aquarium. In order to attach the fixture to the aquarium, typical methods include placing the fixture over the aquarium whereby the entire aquarium opening is covered, and using rods/legs that extend out from the fixture and attach to the top of the sidewalls of the aquarium. These rods/legs elevate the light fixture above the aquarium opening and allow the rod/legs to clamp onto the aquarium. Further methods of attachment include custom ordered aquarium light fixtures that are made to order based on the specific size of the aquarium's opening.

However, these light fixtures with conventional attachment methods lead to reduced access to the aquarium opening. Light fixtures such as these usually require removal of some or all of the light fixture before the aquarium can be accessed for service or cleaning. In addition, light fixtures that use attachment methods involving rods/legs may result in damage to the aquarium, or encounter problems fitting the aquarium due to the incompatibility of the fixture with the aquarium.

BRIEF SUMMARY OF EMBODIMENTS OF THE INVENTION

Various embodiments of the present invention provide a lighting system and apparatus that may be utilized with aquariums. The features and functionality of the lighting system and apparatus provide easy access to the opening of an aquarium for various purposes, such as cleaning and maintenance. In addition, the features and functionality of some embodiments provide for a lighting system that does not require ballasts, light sockets, or a multitude of wiring, and includes a modular design. Further, for some embodiments, features of the present invention allow the lighting apparatus to illuminate the aquarium, while simultaneously limiting the evaporation of water from the aquarium.

Regarding maintenance, in some embodiments the modular design of the lighting system provides easy access and maintenance of the various components of the system. For example, in some embodiments, not all the light fixtures need be to removed or rendered ineffective if the power supply fails. Rather, upon the failure of a modular light fixture, or the failure of a power supply unit to a modular light fixture, the failed component may be removed and replaced without disturbance of the functional components.

It should be noted that although the present invention is described within the context of aquariums, it would be appreciated by those of ordinary skill in the art that various embodiments of the present invention may also be utilized in applications other than aquariums, such as in the field of horticulture.

According to one embodiment, an aquarium lighting system is provided, comprising: (a) a modular light fixture, comprising: (1) a heat sink; (2) a light element mounted to the heat sink, wherein a thermal compound is disposed between the light element and the heat sink and the heat sink is configured to dissipate heat generated by the light element; and (3) a clear acrylic cover that protects the light element from ater exposure; and (b) a power supply unit that is electrically coupled to the modular light fixture, wherein the power supply unit supplies power to the modular light fixture. In some embodiments, the power supply unit is located on the modular light fixture.

According to another embodiment, a modular aquarium light fixture is provided, comprising: (1) a lighting element; and (2) a heat sink comprising a slot, wherein the slot comprises a slot opening disposed on a side of the heat sink, and the slot comprises at least one slot wall having a longitudinal opening; (a) wherein the lighting element is configured to be inserted into the slot through the slot opening, wherein the slot is configured to receive and removably retain the lighting element, (b) wherein the slot retains the lighting element such that once the lighting element is placed into the slot, the lighting element is able to emit light from the heat sink through the longitudinal opening, and (c) wherein the heat sink is configured to dissipate heat generated by the lighting element. In some such embodiments, the modular aquarium light fixture further comprises a first connector at an end of the slot configured to electrically couple to the lighting element once the lighting element is inserted into the slot and the lighting element reaches the end of the slot.

In a further embodiment, a modular aquarium light fixture is provided, comprising: (1) a removable light module comprising: a printed circuit board having an anterior surface, a posterior surface, and a board contour that is substantially circular, a light element disposed on the anterior surface, and a plurality of conductive contacts disposed on the anterior surface; and (2) an open cavity configured to receive and selectively retain the removable light module, the open cavity comprising: (a) a cavity wall having a height that corresponds to the profile of the printed circuit board, and having a shape configured to receive the board contour, (b) a cavity rim having a plurality of protruding elements that each have a posterior side facing the interior of the cavity, and configured to receive the removable light module, and (c) a conductive element disposed on the posterior side of each protruding element; wherein the board contour comprises a plurality of grooves that correspond to the protruding elements of the cavity rim, thereby allowing the removable light module to be inserted into the open cavity, and the height of the cavity wall is such that once the removable light module is placed within the open cavity and rotated within the open cavity to a secure position, at least one of the plurality of conductive contacts comes in contact with the conductive element of at least one of the plurality of protruding elements. In some such embodiments, a surface feature is disposed on the anterior surface of the printed circuit hoard, the surface feature configured to assist in retaining the removable light module in the open cavity once the removable light module is placed within the open cavity and rotated within the open cavity to the secure position.

Depending on the embodiment, the power supply unit may be electrically coupled to the modular light fixture through a terminal strip, where the terminal strip provides a screw-less connection between the power supply unit and the modular light fixture. For some such embodiments, the terminal strip utilizes a tabbed connection mechanism or a clip-connection mechanism to connect the power supply to the modular light fixture. In further such embodiments, the power supply unit is a direct current driver and the aquarium lighting system further comprises a second terminal strip, wherein the second terminal strip connects the direct current driver to an alternating current power supply.

In other such embodiments, the aquarium light further comprises a mounting mechanism configured to mount the modular light fixture onto an aquarium wall. Optionally, the clear acrylic cover can be configured with a silicon gasket that covers one or more lighting elements to protect it from exposure to water.

In some embodiments, the heat sink is constructed of aluminum. Further, in some embodiments, the modular light fixture is configured as a light strip housing a series of light elements.

The light element may be mounted on a printed circuit board and the printed circuit hoard mounted to the heat sink. Additionally, the light element may be removable. Depending on the embodiment, the light elements utilized may include light emitting diodes (LEDs), organic light emitting diodes (OLEDs), xenon bulbs, halogen bulbs, and electroluminescent (EL) light source (e.g., an EL panel or film).

In various embodiments, an internal reflector is mounted on the light element for providing an angular light dispersion. For some such embodiments, the internal reflector provides 15, 60, or 90 degrees of angular light dispersion. For other such embodiments, the internal reflector is adjustable to an angular light dispersion between 15 to 90 degrees.

In some embodiments, the mounting mechanism comprises: a fixture chassis configured to mount to the aquarium wall; and a screw to mount the modular light fixture to the fixture chassis. In other embodiments, the mounting mechanism comprises: a fixture chassis configured to mount to the aquarium wall; a resting bracket configured to rest on the fixture chassis; and a screw to mount the resting bracket to the modular light fixture.

In additional embodiments, the clear acrylic cover comprises an optical lens placed at a location on the clear acrylic cover above the light element. In some such embodiments the optical lens provides 15, 60, or 90 degrees of angular light dispersion. In further such embodiments, the optical lens is adjustable to an angular light dispersion between 15 to 90 degrees. In other embodiments, the terminal strip utilizes a tabbed connection mechanism clip-connection mechanism to connect the power supply to the modular light fixture.

For some embodiments, the modular light fixture further comprises a thermal switch configured to shut power off to the modular light fixture when the modular light fixture is operating above a max operating temperature. For example, an embodiment may be configured with an internal thermal switch that turns off the terminal strip or the modular light fixture in the event that either or both are operating above the max operating temperature. Additionally, the thermal switch may be internal or external to the modular light fixture or the terminal strip.

For other embodiments, the modular light fixture further comprises an internal circuit configured to shut power off to the modular light fixture when the internal circuit detects a ground fault. For example, some embodiments may be configured with a ground fault circuit interrupter (GFCI) that protects a modular light fixture (or, alternatively, the entire lighting system) during a ground fault situation.

In additional embodiments, the modular light fixture is configured to be connected as a link in a daisy chain of modular light fixtures. In further embodiments, the modular light fixture further comprises a male power connection or a female power connection. In some embodiments, the power supply is configured with a power splitter to power two or more modular light fixtures.

In other embodiments, the aquarium lighting system further comprises a controller connected between the power supply unit and the modular light fixture, wherein the controller controls a parameter of the light element in the modular light fixture. Some example parameters controlled by the controller include, but are not limited to, color patterns, light intensity, and lighting timing.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not ply or require that the invention be implemented or used in a particular spatial orientation unless explicitly stated otherwise.

The figures are not intended to be exhaustive or to the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward a lighting system and apparatus that may be utilized with aquariums. The features and functionality of the lighting system and apparatus provide easy access to the opening of an aquarium for various purposes, such as cleaning and maintenance. In addition, the features and functionality of some embodiments provide for a lighting system that does not require ballasts, light sockets, or a multitude of wiring, and has a modular design. Further, for some embodiments, features of the present invention allow the lighting apparatus to illuminate the aquarium, while simultaneously limiting the evaporation of water from the aquarium.

Figure 1A:
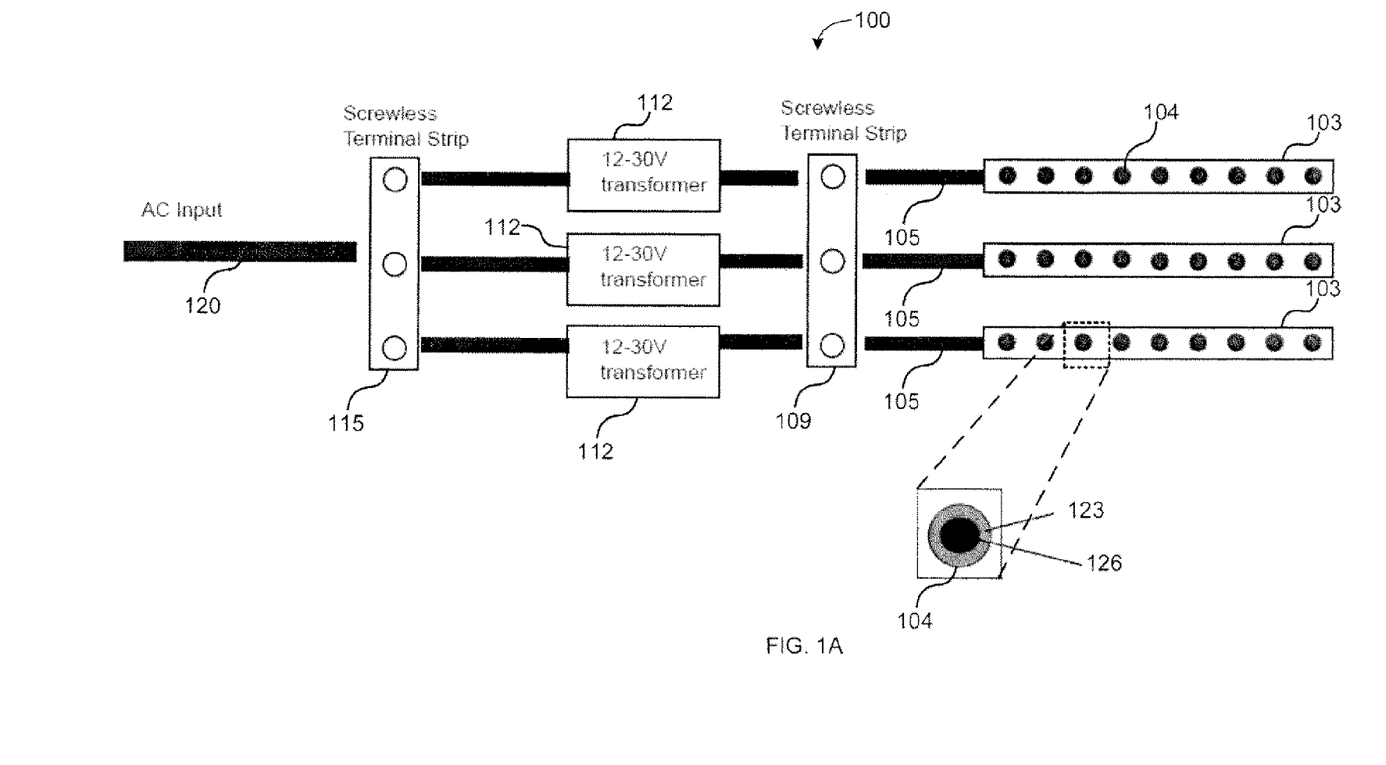
FIGS. 1A and 1B are diagrams illustrating example lighting systems in accordance with embodiments of the invention.

FIG. 1A is a diagram illustrating an example lighting system 100 in accordance with an embodiment of the invention. The illustrated lighting system comprises modular light fixtures 103, screw-less terminal strips 109 and 115, and 12 to 30-volt transformers 112. As illustrated, the modular light fixtures 103 comprise light elements 104, each of which comprises a light-emitting diode 126 and internal reflector 123. In some embodiments, the light element 104 may be mounted to a printed circuit board, which may be removable from the modular light fixture 103 and replaced when necessary. Additionally, the internal reflector provides a light dispersion adequate to illuminate an object, such as an aquarium. In some embodiments, the light elements 104 are arranged such that each light element's light dispersion overlaps with that of another light element's light dispersion.

Power to the individual modular light fixtures 103 is provided through individual power connections 105, which are each connected to a power supply unit 112 through a screw-less terminal strip 109. An additional screw-less terminal strip 115 connects each power supply 112 to an alternating current (AC) power supply 120. Through screw-less terminal strip 109, a modular light fixture 103 can be replaced without disturbing the other modular light fixtures 103, and through screw-less terminal strips 109 and 115, each power supply unit 112 can be replaced without disturbing the other power supply units 112. As further illustrated in FIG. 1, the alternating current (AC) from power connection 120 is converted into a 12-volt direct current (DC) for each modular light fixture 103, and the conversion is facilitated for each modular light fixture 103 by a corresponding 12-volt transformer (or driver) 112.

Figure 1B:
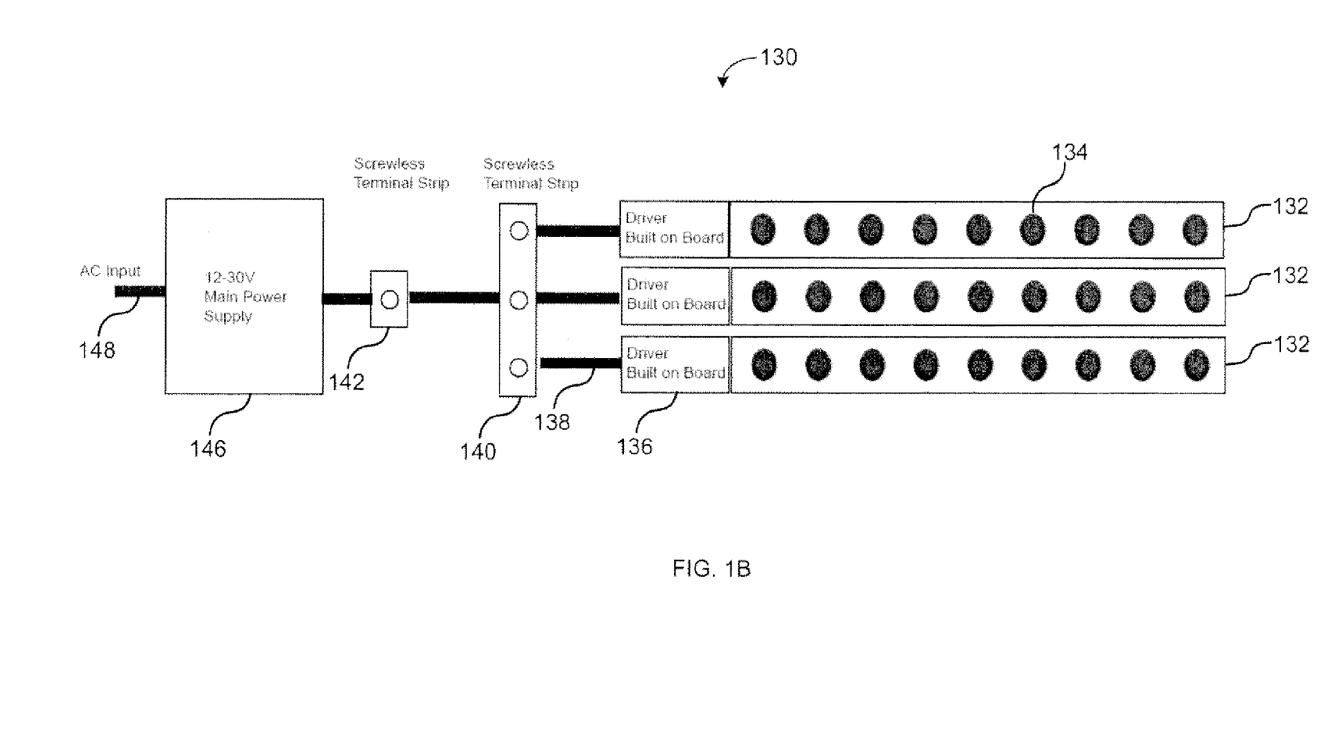

FIG. 1B is a diagram illustrating an example lighting system 130 in accordance with an embodiment of the invention. The illustrated lighting system comprises modular light fixtures 132, screw-less terminal strips 140 and 142, and 12-30 volt main power supply 146. As illustrated, the modular light fixtures 132 comprise light elements 134, and drivers 136 built into the modular light fixtures 132 that power the light elements 134. For some embodiments, the light elements 134 and the driver 136 for a given modular light fixture 132 are built onto a printed circuit board. Power connections 138 provide power to individual modular light fixtures 132 from the main power supply 146 through screw-less terminal strips 140 and 142.

Figure 2:
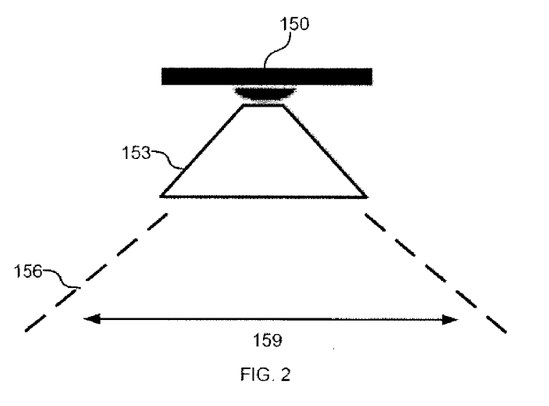
FIG. 2 is a diagram illustrating an example light element in accordance with an embodiment of the invention.

FIG. 2 is a diagram illustrating an example light element 150 in accordance with an embodiment of the invention. Referring now to FIG. 2, light element 150 can be configured with a light emitting diode (LED), an organic light emitting diode (OLED), a xenon bulb, a halogen bulbs, and an electroluminescent (EL) light source (e.g., an EL panel or film). Light element 150 is configured with optical lens 153 that provides for an angular light dispersion 156 to illuminate an object within the area 159 of light dispersion. For example, the angular light dispersion may be 15 degrees, 60 degrees, or 90 degrees. The area 159 of light dispersion depends on the distance from the light element 150.

Figure 3:
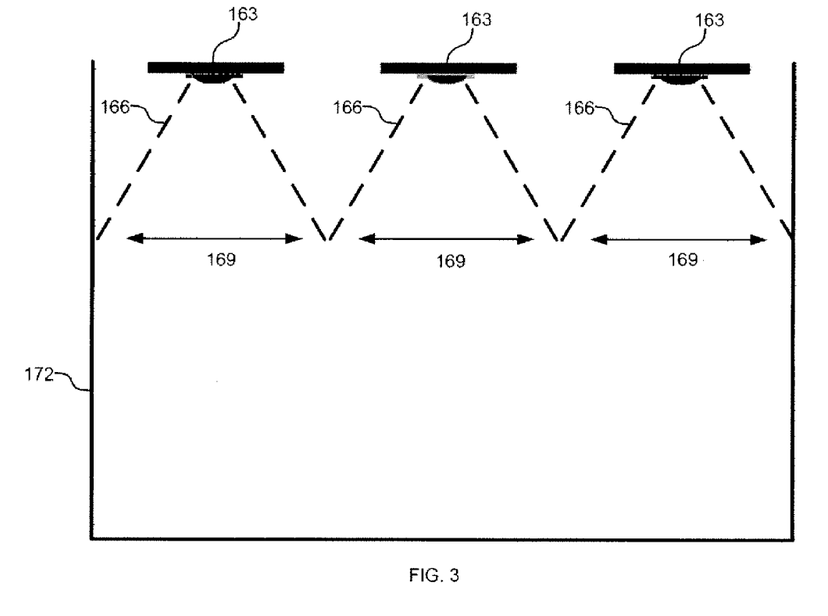
FIG. 3 is a diagram illustrating an example arrangement of modular lighting fixtures in accordance with an embodiment of the invention.

Turning now to FIG. 3, an example arrangement of modular lighting fixtures 163 is depicted in the context of an aquarium 172, in accordance with an embodiment of the invention. The modular light fixtures 163 are arranged such that the angular light dispersion 166 of each light fixture 163 overlaps with the light dispersion of an adjacent light fixture 163. In doing so, the modular light fixtures 163 provide adequate illumination for the aquarium.

Figure 4:
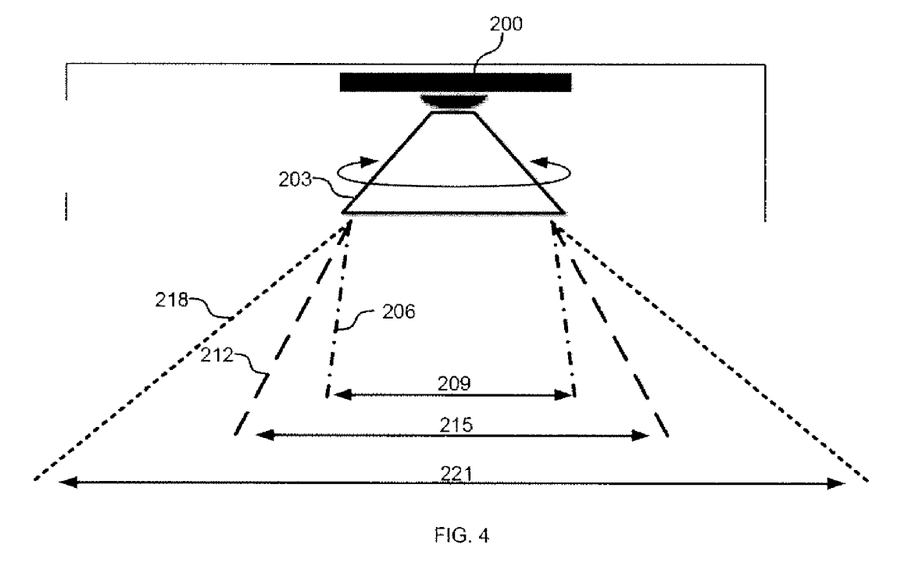
FIG. 4 is a diagram illustrating an example of an adjustable light element in accordance with an embodiment of the invention.

FIG. 4 illustrates a diagram of an alternative light element 200 that is adjustable in accordance with an embodiment of the invention. Specifically, the light element 200 is configured with an optical lens 203 that provides an adjustable angular light dispersion. The illustrated variable light dispersion (206, 212, and 218) and illumination area (209, 215, and 221, respectively) can be adjusted by rotating the optical lens 203 in a clockwise or counter-clockwise manner about the light element 200. For some embodiments, by twisting the optical lens 203 about the light element 200, the light element 200 telescopes closer or farther from the optical lens 203 and, thereby, changes the angular light dispersion caused by the optical lens 203.

Figure 5:
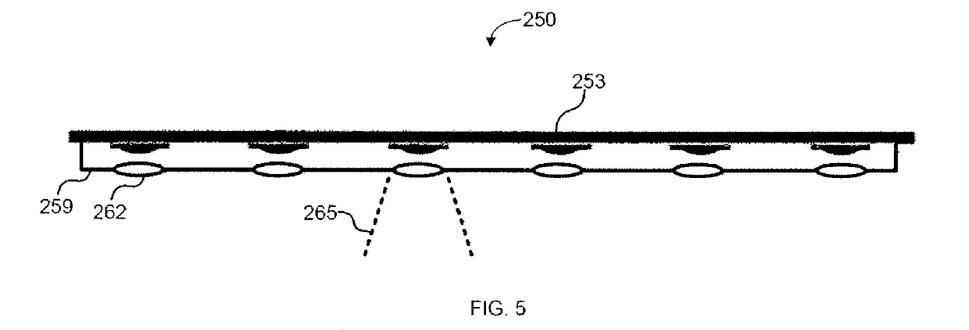
FIG. 5 is a diagram illustrating an example light strip in accordance with an embodiment of the invention.
Figure 6:
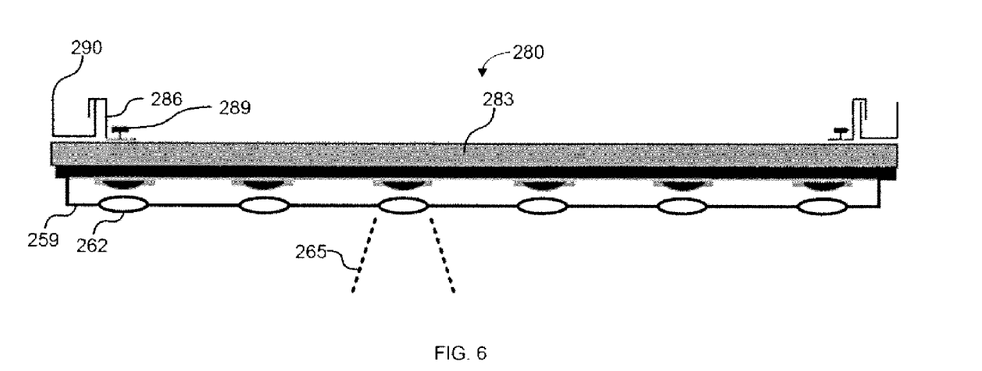
FIG. 6 is a diagram illustrating an example light strip with a mounting mechanism in accordance with an embodiment of the invention.
Figure 7:
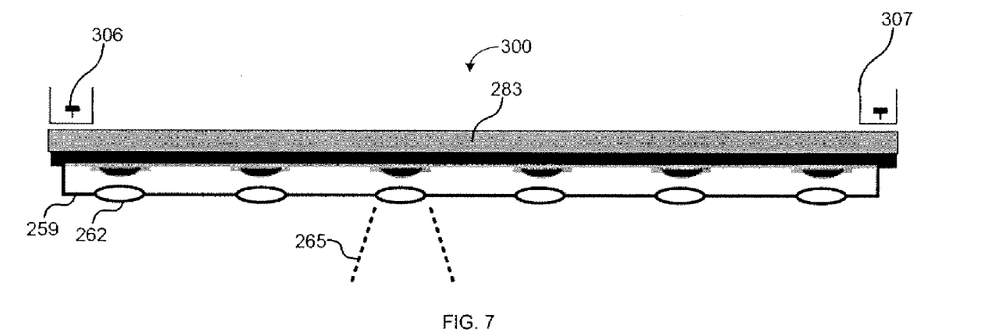
FIG. 7 is a diagram illustrating an example light strip with another mounting mechanism in accordance with an embodiment of the invention.

FIG. 5 is a diagram illustrating a example light strip 250 in accordance with an embodiment of the invention. The light strip 250 comprises light elements 253, each having an optical lens 262 positioned in front of it that provides a light dispersion 265. In some embodiments, the light elements 253 are mounted to the light strip 250 via an internal frame (not shown). The light strip 250 can be constructed of, for example, aluminum, which allows for efficient heat dissipation upward and away from the source of heat, light elements 253. The optical lenses 262 illustrated are part of the cover 259, which both covers the internals of the light strip 250, and protect the light elements from water exposure. In some embodiments, the light strip 250 is further configured with a heat sink, which further provides heat dissipation for the light elements 253. FIGS. 6 and 7, as described below, depict two such embodiments.

FIG. 6 is a diagram illustrating an example light strip 280 configured with a heat sink 283, and a mounting mechanism (286, 289, 290), in accordance with an embodiment of the invention. The heat sink may be constructed of a material such as aluminum, which provides for efficient dissipation of heat produced by the lighting elements. It should be noted that for those embodiments used with an aquarium, the efficient heat dissipation mitigates the effect the light elements have on the aquarium which they are mounted. Such heat dissipation increases the life span of the light elements, mitigates the harm to the marine life by caused by the heat, and lessens the rate of water evaporation caused by the heat.

It should also be noted that in some embodiments (not illustrated), a thermal compound (also referred to as thermal grease, thermal gel, or heat paste) may be utilized to assist in thermal conductivity between a light element and a heat sink. For example, the thermal compound may be disposed between the heat sink 283 of FIGS. 6 and 7, and the light elements 253 of FIG. 5. Depending on the embodiment, the light elements may be mounted to the heat sink directly or by way of an internal frame. In embodiments where the light elements are directly mounted to the heat sink, the thermal compound may be disposed between the light elements and the heat sink. In embodiments where the light elements are mounted to the heat sink through an internal frame, the thermal compound may be disposed between the tight element and the internal frame or between the internal frame and the heat sink. The thermal compound may be ceramic-based, metal-based, carbon-based, or liquid based.

The mounting mechanism allows for the light strip 280 to mount to an aquarium wall. In the illustrated configuration, the mounting mechanism comprises a fixture chassis 290, which can be mounted to the aquarium wall, resting brackets 286 configured to rest on the fixture chassis 290, and screws 289 to mount the resting brackets to the light strip 280.

Similarly, FIG. 7 illustrates a light strip 300, but with an alternative mounting mechanism (306, 307) in accordance with an embodiment of the invention. As illustrated, the mounting mechanism of FIG. 7 comprises a fixture chassis 307, which is attached to light strip 300 using screws 306.

Figure 8:
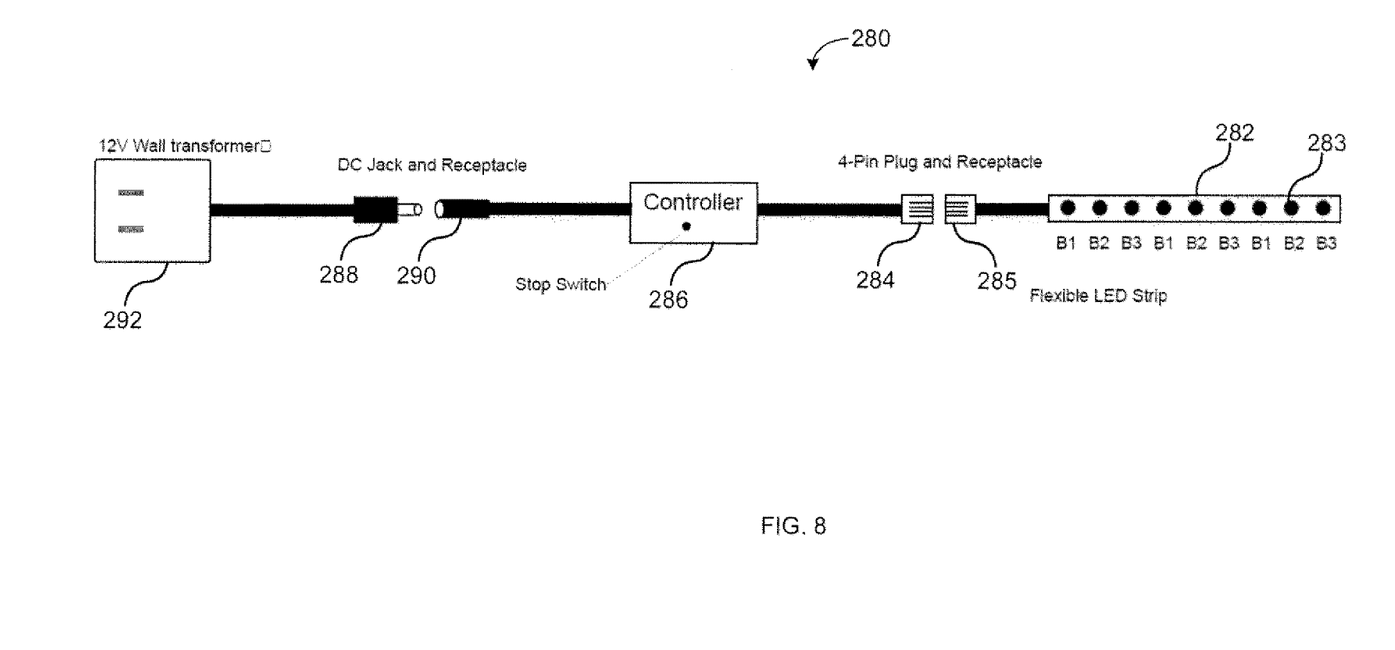
FIG. 8 is a diagram illustrating an example lighting system in accordance with an embodiment of the invention.

FIG. 8 is a diagram illustrating a lighting system 280 in accordance with an embodiment of the invention. The lighting system 280 comprises a 12-volt wall transformer 292, a light controller 286, and a modular light fixture 282 comprising light elements 283. The modular light fixture 282 may be configured with a series of identically colored light elements (e.g., blue light-emitting diodes) that allow for variable light intensity, or a series of blue, red, and green light elements that allow for different color patterns. In lighting system 280, the modular light fixture 282 is configured as a flexible light-emitting diode (LED) strip.

The light controller 286 illustrated may be used in some embodiments to control the behavior and parameters of the light elements 283 within the modular light fixture 282. For example, light controller 286 may control the color pattern, light intensity, or timing of light patterns emitted from the modular light fixture 282. Additionally, the light controller 286 may be configured with a stop switch, which when engaged would cause the controller 286 to stop or pause the logic the controller 286 is performing through the modular light fixture 282.

For modularity, some embodiments are implemented with tool-less connectors that allow for easy removal and replacement of components of the lighting system. For example, in the lighting system 280, the system is configured with a direct current (DC) jack 288 and DC receptacle 290, allowing the wall transformer 292 to be easily disconnected from the lighting system 280 without the need for tools. Similarly, lighting system 280 is further configured with a 4-pin plug 284 and receptacle 285, which allows the controller 286 and/or the modular light fixture 282 to be easily disconnected from the lighting system 280.

Figure 9A:
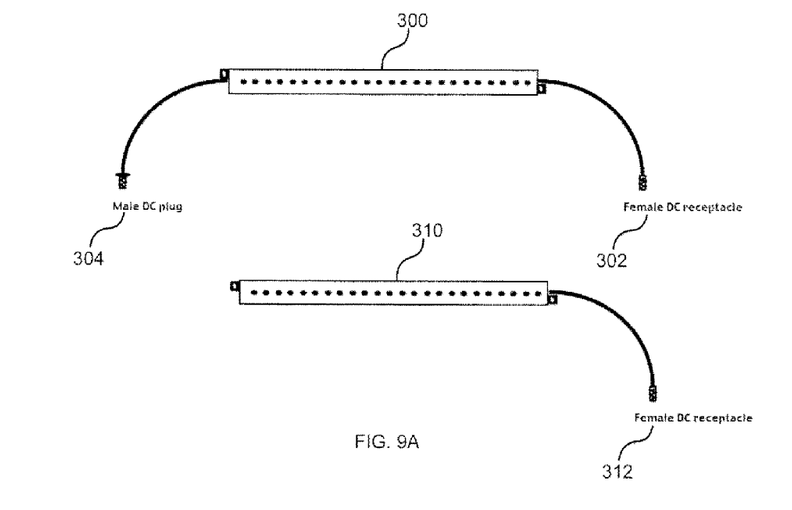
FIGS. 9A and 9B are diagrams illustrating example modular light fixtures in accordance with embodiments of the invention.

In certain embodiments of the invention, the modular light fixtures are further configured with male and/or female power connectors that allow the modular light fixture to be implemented in a daisy chain configuration with other modular light fixtures. Examples of such modular light fixtures are illustrated in FIG. 9A. Referring now to FIG. 9A, modular light fixture 300 is configured with a male DC plug 304 and a female DC receptacle 302, allowing it to be connected directly to (i) a power supply unit, (ii) one modular light fixture in a daisy chain configuration, (iii) one modular light fixture and a power supply unit in a daisy chain configuration, or (iv) two modular light fixtures in a daisy chain configuration. In some embodiments, the modular light fixtures are flexible light-emitting diode (LED) strips.

Figure 9B:
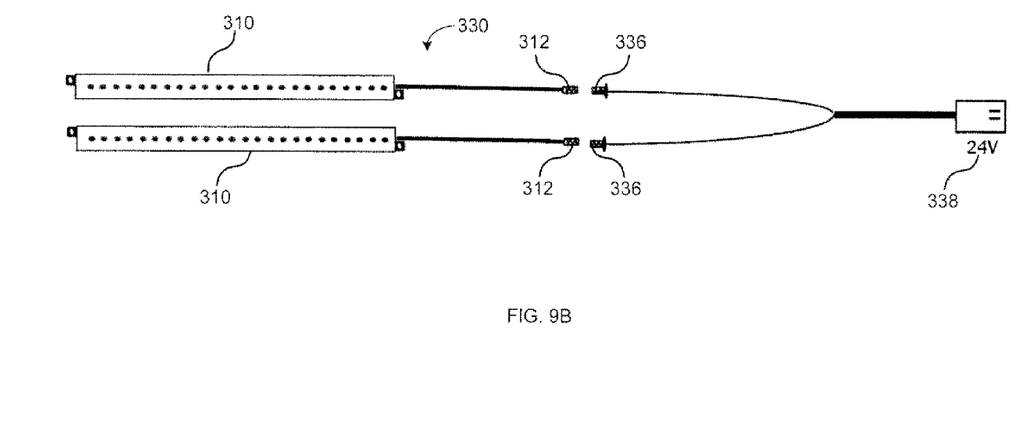

Optionally, for modular light fixtures that are connected at the end of a daisy chain configuration, or directly to a power supply unit, the modular light fixture may be configured with only a male plug or a female receptacle. Such is the case for modular light fixture 310, which is configured with only a female DC receptacle 312, which can accept a male plug from a power supply unit or a male plug from another modular light fixture having a male DC plug (e.g., nodular light fixture 300). In alternative embodiments, a lighting system can be configured with two or more modular light fixtures such light fixture 310, and powered by a single power unit having a splitter. Such is the case in FIG. 9B, where lighting system 330 comprises a 24-volt power supply 338 having a splitter with male DC plugs 336.

Figures 10A, 10B:
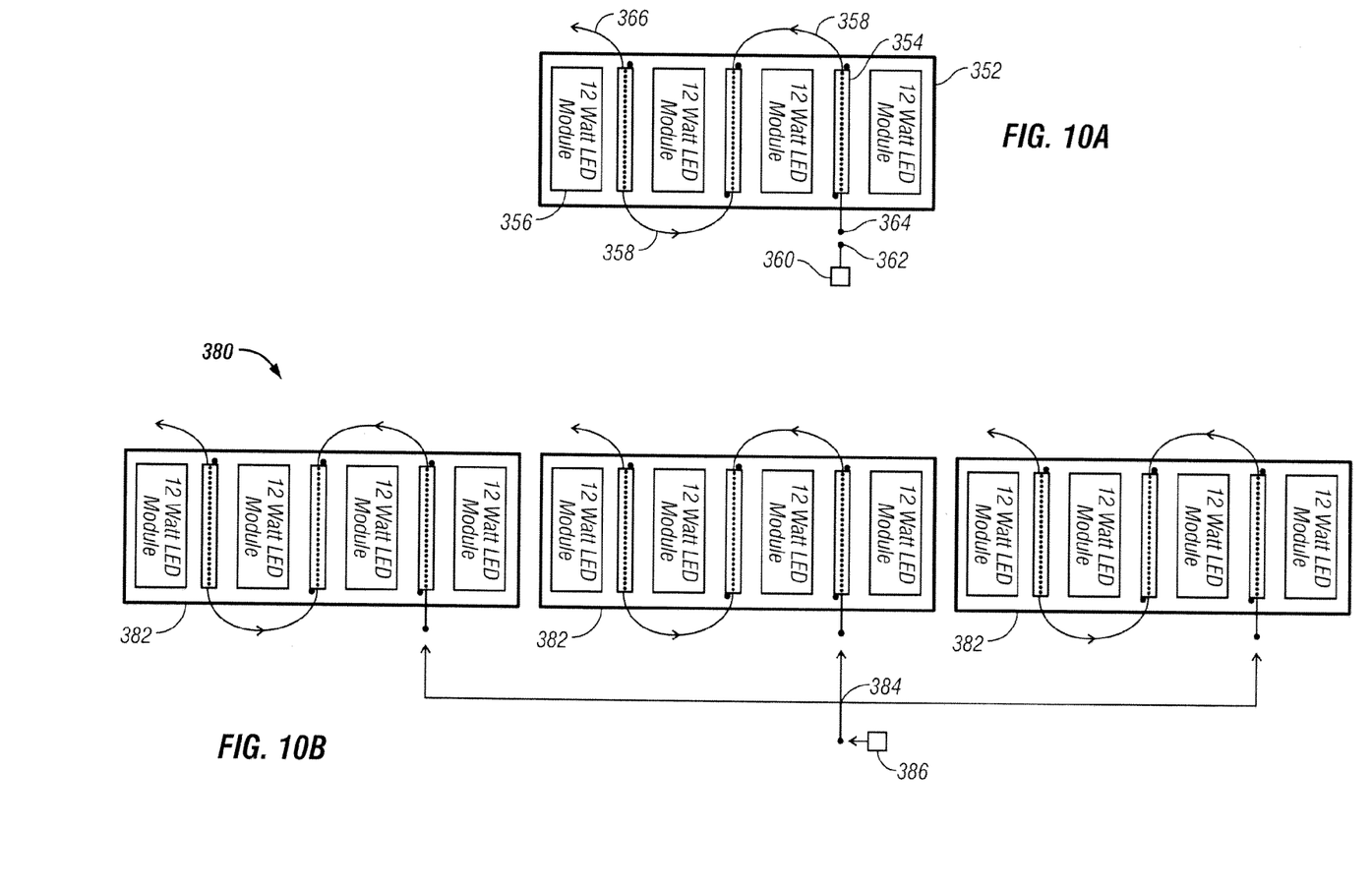
FIGS. 10A and 10B are diagrams illustrating example lighting systems in accordance with embodiments of the invention.

FIG. 10A is diagram illustrating an example lighting system 352 in accordance with an embodiment of the invention, wherein the modular light fixtures 354 are installed in a daisy chain configuration via connection points 358. In some embodiments, the connections points 358 comprise a male power plug and a female power receptacle, similar to those of 366 and 364, respectively. The lighting system 352 also comprises a modular power supply 360 that can be easily disconnected from the system via the male power plug 362 of the power unit and female power receptacle 364 of one of the modular light fixtures 354. As illustrated, the lighting system 352 is additionally configured with 12-watt light-emitting diode modules 356 to accompany the modular light fixtures 354.

Optionally, the lighting system 352 can be powered by a power unit commonly shared with other lighting systems via the female power receptacle 364. Such an example configuration is illustrated in light configuration 380 of FIG. 10B, where the lighting systems 382 are commonly powered by power supply 386 providing power to each of the systems through an attached power splitter 384.

Figure 11:
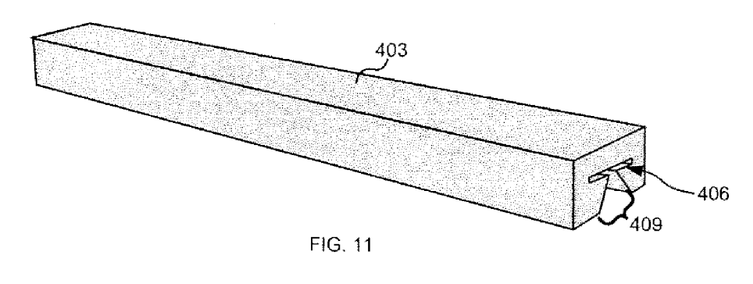
FIG. 11 is a diagram illustrating a heat sink of an example modular aquarium light fixture in accordance with an embodiment of the invention.

FIG. 11 is a diagram illustrating an example modular aquarium light fixture in accordance with an embodiment of the invention. Specifically, the illustrated embodiment comprises a heat sink 403, which is generally elongated in shape. On one end of the heat sink 403 is disposed a slot opening 406, configured to slidably receive a strip of light elements. The heat sink is also configured with a longitudinal opening 409, which is disposed along one of the slot walls. After reading this description, one of ordinary skill in the art would appreciate that in other embodiments the heat sink, slot opening or longitudinal opening have different shapes, sizes, etc from hose illustrated in FIG. 11 without departing from the scope of the present invention.

Continuing with reference to FIG. 11, in accordance with some embodiments, once a strip of light elements has been inserted into the slot opening 406, the slot is configured to retain the strip of lights such that the light emitted by light elements can radiate outward from the heat sink 403 through the longitudinal opening 406. The heat sink 403 is configured to concurrently assist in the dissipation of heat generated by the strip of lights. The heat sink 406 may be constructed of metal suitable for thermal conductivity, such as aluminum, and may be additionally configured with extended surfaces such as fins (not shown), which further improves its ability to dissipate heat from the light elements.

Figure 12:
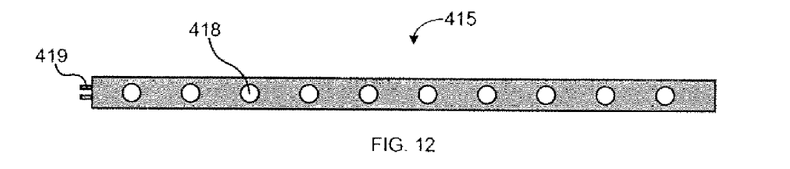
FIG. 12 is a diagram illustrating an example light strip in accordance with an embodiment of the invention.

Referring now to FIG. 12, a diagram is provided illustrating an example light strip 415 in accordance with an embodiment of the invention. As illustrated, the light strip 415 comprises a number of light elements 418 disposed on one side of the strip. As discussed earlier above, the light elements may be a light emitting diode (LED), an organic light emitting diode (OLED), a xenon bulb, a halogen bulb, or an electroluminescent (EL) light source (e.g., an EL panel or film). At one end, the light strip 415 is equipped with power source pins 419 configured to be received by a power connector disposed at distal end of the slot opposite the slot opening 406. Additional information with respect to the power pins 419 and a power connector is provided hereinbelow with respect to FIG. 14.

Figure 13:
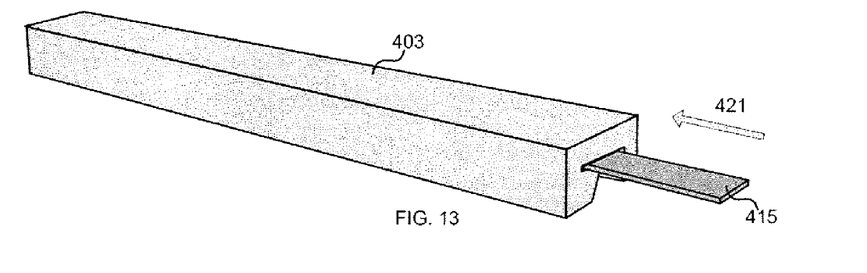
FIG. 13 is a diagram illustrating the insertion of the example light strip of FIG. 12 into the heat sink of FIG. 11.

Turning now to FIG. 13, a diagram is provided illustrating the insertion of example light strip 415 into heat sink 403. As shown, the light strip 415 is dimensioned to be inserted into the slot opening 406 of heat sink 403 with its light elements 418 face downward toward the longitudinal opening 409. One of ordinary skill in the art would understand and appreciate that in other embodiments, the tight strip and the heat sink may be configured differently (e.g., as set forth below) such that a light strip may be inserted into the slot of the heat sink in an alternative method to the one shown. Further embodiments of the present invention may feature a heat sink configured with a longitudinal opening that allows for insertion of the light strip through the opening. Such an embodiment may further comprise a light strip that is flexible down its center, thereby facilitating its insertion into the heat sink via the longitudinal opening. In another embodiment, the heat sink may comprise of two or more individual halves that that can be separated to insert or remove a light strip, and then joined back together (e.g., via hinges, clips, or screws).

Figure 14:
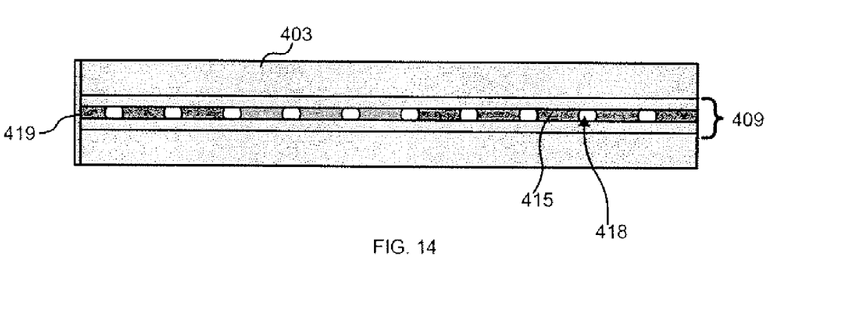
FIG. 14 is a diagram illustrating the use of the example light strip of pure 12 with the heat sink of FIG. 11.

FIG. 14 is a diagram that provides a bottom view of the example heat sink 403 with the light strip 415 installed. The heat sink 403 comprises the longitudinal opening 409, which allows light from the light elements 418 (of light strip 415) to be emitted from the heat sink 403 once the light strip is installed. In particular, a power connecter 419 at the distal end of the slot provides power to light strip 415 once it is fully inserted into the slot of heat sink 403. In the illustrated embodiment, the longitudinal opening 409 includes a tapered surface such that the opening 409 becomes larger moving away from the light strip 415, thereby allowing the heat sink 403 to securely retain light strip 415 while maximizing dispersion of light. It would be well understood by those of skill in the art that the longitudinal opening of other embodiments may include different shapes and sizes from the one shown, without departing from the scope of the invention. By way of example, the surfaces of the longitudinal opening may be vertical in shape with no taper.

Figure 15:
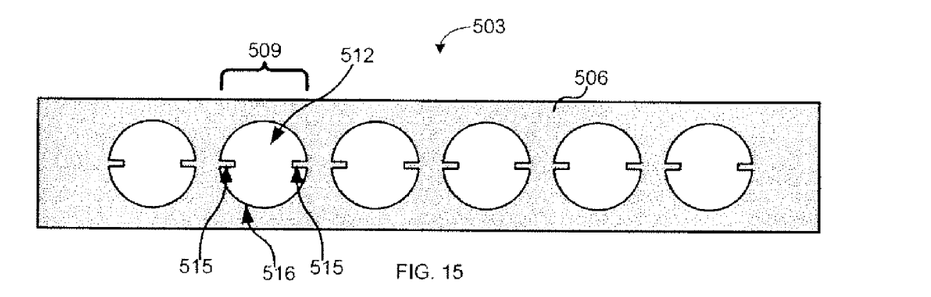
FIG. 15 is a diagram illustrating an example modular aquarium light fixture in accordance with an embodiment of the invention.
Figure 16A:
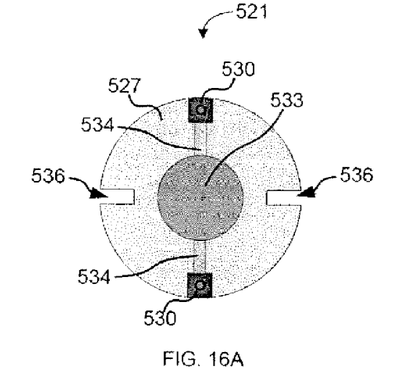
FIGS. 16A and 16B are diagrams illustrating an example light element module in accordance with an embodiment of the invention.
Figure 16B:
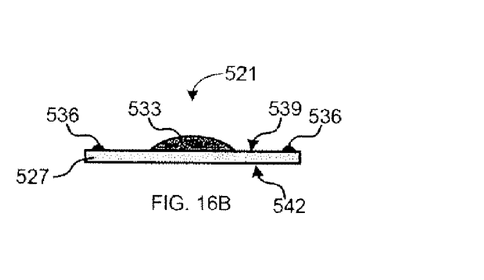

Referring to FIGS. 15-16, an example modular aquarium light fixture 503 is illustrated, in accordance with an embodiment of the invention, that is configured to receive and removably retain printed circuit board (PCB) light modules. In the illustrated embodiment, the fixture 503 comprises a plurality of open cavities 509 that function as sockets for the PCB light modules. Each of the illustrated open cavities 509 (i.e., sockets) has a cavity opening 512 defined by a cavity rim 516. In addition, the cavity rim 516 comprises two protrusions 515. In the illustrated embodiment, the protrusions 515 are designed and utilized to both retain the PCB light module 521 within the open cavity 509, and to power the PCB light module 521 once its inserted and secured in place.

Continuing with reference to FIG. 15, depending on the embodiment, the protrusions 515 may number more than two. In addition, the protrusions 515 may be utilized for predefining the orientation of a PCB light module 521 during its insertion into the open cavity 509, and may have different shapes with respect to one another (which may further assist in predefining the orientation of the PCB light module 521 during insertion).

Although the cavity rim 516 is shown to be substantially circular in shape, in other embodiments, the cavity rim 516 may be shaped in something other than a circle, such as a square, rectangle, or triangle, and the shape of the cavity rim 516 may or may not match the shape of the PCB light module 521. Additionally, in some embodiments, the cavity rim 516 may be shaped differently from the open cavity wall. For example, although open cavity 509 has a cavity rim 516 that is substantially circular, the cavity walls of open cavity 509 may form a square.

FIG. 16A is a diagram illustrating a top view of a PCB light module 521 in accordance with an embodiment of the invention. Specifically, the PCB light module 521 comprises: a light element 533, contact pads 530 that provide the PCB with power for the light element 533, and conductive traces 534 that provide power from the contact pads 530 to the light element 533. The contour of the PCB light module 521 is substantially circular, and comprises grooves 536 (also referred to as notches) that correspond to protrusions disposed along the cavity rim of a light fixture. The particular grooves 536 shown correspond to the protrusions 515 of cavity rim 516 displayed in FIG. 15. In some embodiments, the grooves are configured so to allow the PCB light module to be inserted into open cavity functioning as a socket. Depending on the embodiments, the grooves 536, like the protrusions 515 described above, can be utilized to predefine the orientation of the PCB light module 521 when it is being inserted into an open cavity socket 512. Additionally, though the illustrated embodiment has a substantially circular contour, in some embodiments the PCB light module 521 may have a different contour (e.g., triangular, rectangular, or square) without departing from the scope of the invention.

FIG. 16B is a diagram illustrating a profile view of the of the PCB light module 521. Referring now to FIG. 16B, shown are the anterior surface 539 and the posterior surface 542 of the PCB light module 521, the contact pads 536 disposed on the anterior surface 539, and the light element 533 disposed on the anterior surface 539. The width 527 of the PCB light module 521 and the location and thickness of the contact pads 536 are such that once the light module 521 is inserted into an open cavity (e.g., 509) and twisted to a secure position within the open cavity, (a) the contact pads 536 align underneath at least two protrusions of the cavity rim that are equipped with conductive elements 557, and (b) the contact pads 536 come in contact with those conductive elements 557, thereby providing power to the PCB light module 521.

Figure 17A:
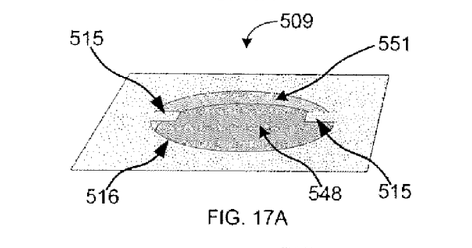
FIGS. 17A and 17B are diagrams illustrating a socket of the example modular aquarium light fixture of FIG. 15.

FIG. 17A provides a perspective view of an open cavity 509 from FIG. 15 functioning as a socket for light modules. The open cavity 509 is shown to comprise cavity rim 516 with two protrusions 515, which define the opening of the cavity, the bottom surface 548 of the cavity, and the cavity wall 551, which in this embodiment is substantially circular and matches the contour of the cavity rim 516. In some embodiments, the cavity wall 551 and the bottom surface 548 are configured to permit a PCB light module 521 to be twisted within the open cavity 509 once it has been inserted. By doing so, the cavity wall 551 and the bottom surface 548 allow the PCB light module 521 to be oriented in a secure position such that the protrusions 515 retain the PCB light module 521 in place, and the contact pads 536 are brought in contact with the conductive elements 557 disposed on the underside of the protrusions 515. More with respect to conductive elements and protrusions 515 is described later with respect to FIG. 17B.

Figure 17B:
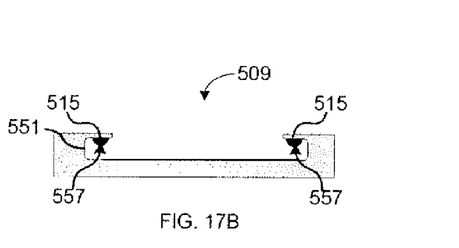

FIG. 17B illustrates a profile view of the open cavity 509 functioning as a socket for a light module 521. FIG. 17B shows conductive elements 557 disposed beneath the protrusions 515 and adjacent the cavity wall 551 of the open cavity 509. As described earlier, in some embodiments, the cavity wall height is such that when a PCB light module 521 is inserted into the open socket, the width 527 of the PCB light module 521, as well as the thickness and location of the contact pads 536 enable the conductive elements 557 to line up and come in contact with the PCB contact pads 536. In doing so, the conductive elements 557 can provide power to the PCB light module 521 through the PCB contact pads 536.

Figure 18:
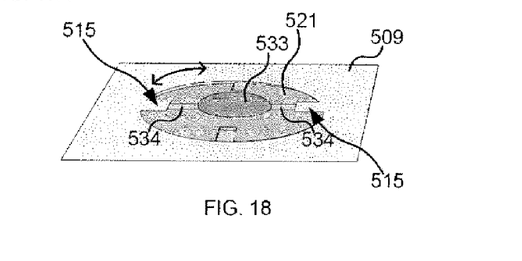
FIG. 18 is a diagram illustrating use of the light element module of FIGS. 16A and 16B with the socket of FIGS. 17A and 17B.

FIG. 18 is a diagram illustrating the PCB light module 521 within cavity 509. The PCB light module 521 is depicted in its secure position within the cavity 509, as indicated by the conductive trace leadings, which lead from the PCB contact pads aligned underneath the protrusions 515. Depending on the embodiment, the PCB light module 521 may be twisted left or right within the cavity 509 when securing to or unsecuring it from the cavity 509.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A modular aquarium light fixture, comprising:
    a removable light module comprising:
        a printed circuit board having an anterior surface, a posterior surface, and a board contour,
        a light element disposed on the anterior surface, and
        a plurality of conductive contacts disposed on the anterior surface; and
    an open cavity configured to receive and selectively retain the removable light module, the open cavity comprising:
        a cavity wall having a height that corresponds to the board contour,
        a cavity rim having a plurality of protruding elements that each have a posterior side facing perpendicular to the direction of protrusion and facing an interior of the cavity, the cavity rim being configured to receive the removable light module, and a conductive element disposed on the posterior side of each protruding element.

2. The modular aquarium light fixture of claim 1, wherein the board contour comprises a plurality of grooves that correspond to the protruding elements of the cavity rim, thereby allowing the removable light module to be inserted into the open cavity, and wherein the height of the cavity wall is such that once the removable light module is placed within the open cavity and rotated within the open cavity to a secure position, at least one of the plurality of conductive contacts comes in contact with the conductive element of at least one of the plurality of protruding elements.

3. The modular aquarium light fixture of claim 1, wherein a surface feature is disposed on the anterior surface of the printed circuit board, the surface feature configured to assist in retaining the removable light module in the open cavity once the removable light module is placed within the open cavity and rotated within the open cavity to the secure position.

4. The modular aquarium light fixture of claim 1, wherein the board contour is substantially circular.

5. An aquarium lighting system, comprising:
a modular light fixture, comprising:
a heat sink;
a removable light module comprising:
a printed circuit board having an anterior surface, a posterior surface, and a board contour,
a light element disposed on the anterior surface, and
a plurality of conductive contacts disposed on the anterior surface; and
an open cavity configured to receive and selectively retain the removable light module, the open cavity comprising:
a cavity wall having a height that corresponds to a profile of the printed circuit board, and having a shape configured to receive the board contour,
a cavity rim having a plurality protruding elements that each have a posterior side facing perpendicular to the direction of protrusion and facing an interior of the cavity, the cavity rim being configured an interior of the cavity, and configured to receive the removable light module, and
a conductive element disposed on the posterior side of each protruding element;
wherein a thermal compound is disposed between the removable light module and the heat sink, wherein the board contour comprises a plurality of grooves that correspond to the protruding elements of the cavity rim, thereby allowing the removable light module to be inserted into the open cavity, and wherein the height of the cavity wall is such that once the removable light module is placed within the open cavity and rotated within the open cavity to a secure position at least one of the plurality of conductive contacts comes in contact with the conductive element of at least one of the plurality of protruding elements.

6. The aquarium lighting system of claim 5, wherein the modular light fixture further comprises a thermal switch configured to shut power off to the modular light fixture when the modular light fixture is operating above a maximum operating temperature.

7. The aquarium lighting system of claim 6, wherein the modular light fixture further comprises an internal circuit configured to shut power off to the modular light fixture when the internal circuit detects a ground fault.

8. The aquarium lighting system of claim 5, further comprising a clear acrylic cover that protects the light element from water exposure, wherein the clear acrylic cover comprises an optical lens placed at a location on the clear acrylic cover above the light element.

9. The aquarium lighting system of claim 5, wherein an internal reflector is mounted on the light element for providing an angular light dispersion.

10. The aquarium lighting system of claim 5, further comprising a mounting mechanism configured to mount the modular light fixture onto an aquarium wall.

11. The aquarium lighting system of claim 10, wherein the mounting mechanism comprises:
a fixture chassis configured to mount to the aquarium wall; and
a screw to mount the modular light fixture to the fixture chassis.

12. The aquarium lighting system of claim 10, wherein the mounting mechanism comprises:
a fixture chassis configured to mount to the aquarium wall;
a resting bracket configured to rest on the fixture chassis; and
a screw to mount the resting bracket to the modular light fixture.

13. The aquarium lighting system of claim 5, wherein the light element includes a light emitting diode, an organic light emitting diode, a xenon bulb, a halogen bulb, or an electroluminescent light source.

14. The aquarium lighting system of claim 5, wherein the modular light fixture is configured to be connected as a link in a daisy chain of modular light fixtures.

15. The aquarium lighting system of claim 5, further comprising a power supply unit that is electrically coupled to the modular light fixture, wherein the power supply unit supplies power to the modular light fixture; and a controller connected between the power supply unit and the modular light fixture, wherein the controller controls a parameter of the light element in the modular light fixture.

16. The aquarium lighting system of claim 15, wherein the parameter includes one or more selected from the group consisting of a color pattern, lighting pattern, light intensity, and light timing.

* * * * *